Jan. 5, 1965 H. H. ADELAAR ETAL 3,164,680

SIGNALLING SYSTEM FOR SUBSTATION APPARATUS

Filed June 12, 1961

Inventors
H.Adelaar-F.Clemens-
R. De Smedt
By [signature]
Attorney

United States Patent Office 3,164,680
Patented Jan. 5, 1965

3,164,680
SIGNALLING SYSTEM FOR SUBSTATION APPARATUS

Hans Helmut Adelaar, Frans Clemens, and René De Smedt, all of Antwerp, Belgium, assignors to International Standard Electric Corporation, New York, N.Y., a corporation of Delaware Filed June 12, 1961, Ser. No. 116,550
Claims priority, application Netherlands, July 21, 1960, 254,029
9 Claims. (Cl. 179—84)

This invention relates in general to a signalling system for telephone substation apparatus and in particular to ringing arrangements in the substation of an electronic telephone switching system. Its principal object is to provide a new and improved electronic telephone system substation ringing arrangement which is economical in manufacture and reliable in operation.

In electronic telephone switching systems, the speech contacts usually utilize devices which have limited power handling capacity. Thus, if the speech path is used for transmitting ringing signals, only a limited amount of ringing energy may be used and the substation requires special apparatus in order to increase the ringing energy to a level sufficient to energize the ringer or audible signalling device at the substation.

Signalling systems of the above character are known wherein voice frequency ringing signals, interrupted at a low frequency, are detected at the substation and are used to control a transistor switch which connects the telephone ringer to direct-current from the central exchange to cause the generation of an audible signal. Other arrangements are known wherein a transistor at the substation is used for amplifying the detected ringing signals and feeding the amplified signals to the telephone ringing device.

Other known systems utilize an electro-acoustic transducer as the signalling device. However, these latter systems are subject to undesirable line noises and must have limited gain in order to prevent singing. Only careful and costly design will overcome the noted disadvantages of these transducers but then they are subject to low electrical efficiency.

A comparison of conventional mechanical ringers and electro-acoustical devices reveals that the mechanical ringers are best suited for producing audible telephone signals. However, the mechanical ringers have low power conversion frequency and are subject to charging and discharge losses in the usual ringer condenser. While these condenser losses may be overcome by suitable tuned circuit arrangements, the components of the tuned circuit have large inductive and capacitive values due to the low frequency interruptions and thus the components are necessarily large and bulky.

According to the present invention, a signalling arrangement utilizing a loudspeaker type of ringer is provided wherein apparatus rectifies the voice frequency ringing signals and utilizes the rectified current of a predetermined amplitude to trigger a voice frequency oscillator at the substation as long as the rectified current remains at the predetermined amplitude. In this manner, line noises are ineffective since the ringing signals are not amplified for ringing purposes, the costly and bulky tuned circuit for the ringer condenser is unnecessary and the ringer is powered from a voice frequency oscillator rather than from direct current on the associated telephone line.

Further, according to the invention, the rectifier is arranged to detect a suitable voice frequency which is transmitted from the exchange during short alternate half periods of low frequency in order to control the substation oscillator to provide low frequency audible ringing signal. This normally would result in the oscillator being tuned on and off during ringing and would create substantial variations in the direct current supplied by the exchange. In order to overcome this disadvantage, the oscillator is connected to the telephone line through a low pass filter or smoothing network consisting of a shunt smoothing condenser and a series inductance. The condenser prevents substantial direct-current variations while the inductance prevents the ringing energy from being absorbed by the condenser. This smoothing filter also prevents oscillator frequencies from being sent rearward to the exchange.

Other objects and features relate to providing the oscillator with a high direct-current impedance so that the variation in current when the telephone substation answers is easily detected for ring trip purposes and in providing ring-back signal tones to notify the calling party that the called substation is being signalled.

Further objects and features of the invention will become apparent and the invention will be best understood from the description of the various embodiments of the invention when read in conjunction with the accompanying drawings comprising FIGS. 1 to 3 wherein.

Figures 1, 2, 3:
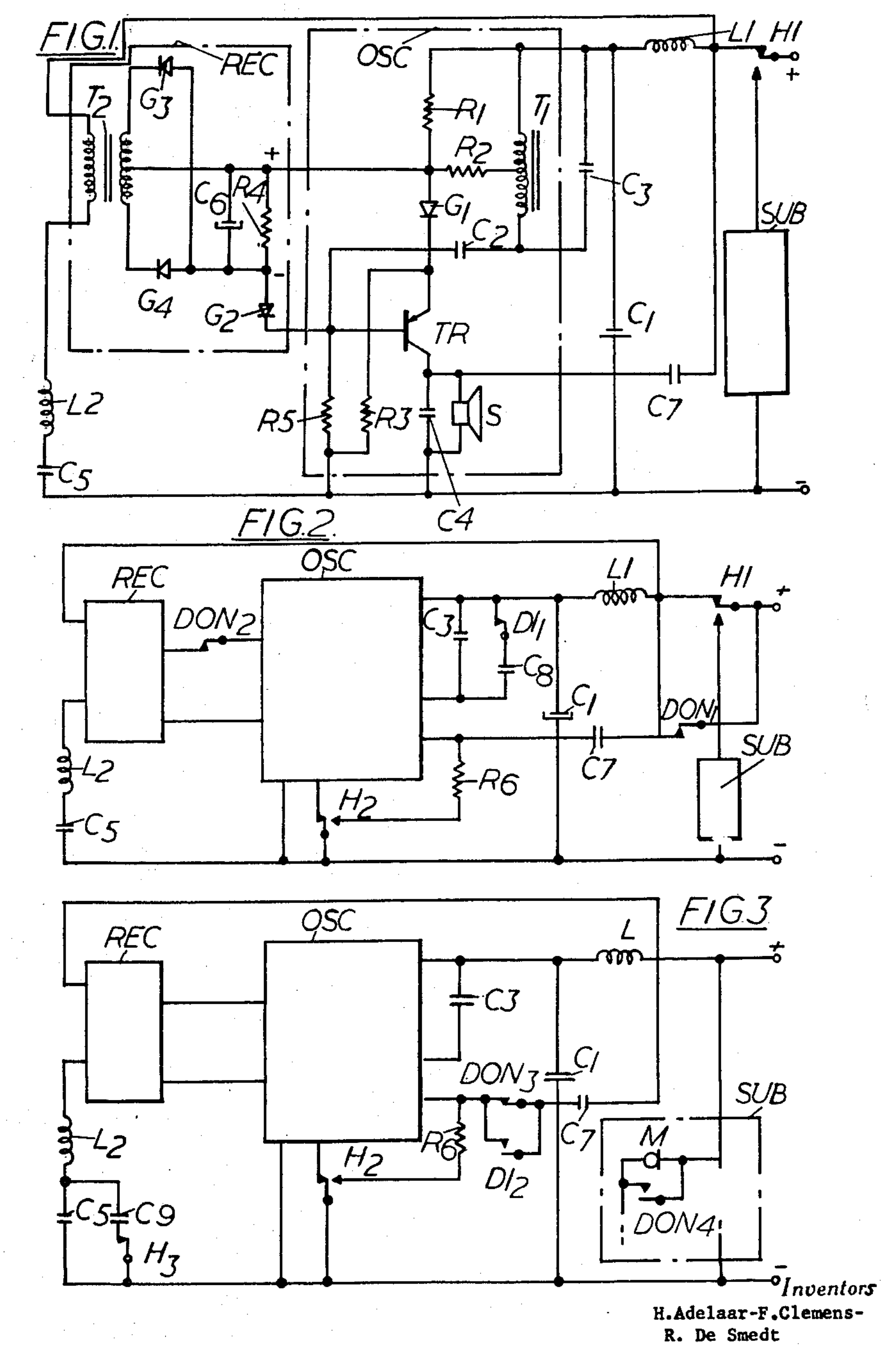
FIG. 1 shows a first embodiment of the invention wherein a direct-current powered voice frequency oscillator is controlled by ringing current.
FIG. 2 shows the oscillator of FIG. 1 modified to be used for generation of dial signals.
FIG. 3 shows a second embodiment of the invention utilizing the same oscillator for numerous signalling functions.

FIG. 1 shows a telephone subset circuit with the conventional part SUB, being shown as a rectangular block which is branched across the line terminals when the change-over cradle contact $H_1$ is displaced from the shown break position to the make position. As shown, the line conductors are connected to a V.F. transistor oscillator OSC and a tuned signal receiver REC which, in response to a signal of suitable frequency transmitted over the line, produces a rectified direct current signal which triggers oscillator OSC.

When the line is idle, the exchange constantly applies battery potential to the line conductors and direct current voltage is therefore supplied at the substation. This current appears at oscillator circuit OSC through the low pass filter or smoothing network $L_1C_1$. Direct current therefore flows from one line conductor, through break contact $H_1$, through inductance $L_1$, through various paths in the oscillator OSC and back to the other line conductor.

The oscillator OSC is essentially an emitter-coupled oscillator wherein the emitter of the PNP transistor TR is connected to the positive conductor through rectifier $G_1$ and emitter resistor $R_1$ in series. Part of the voltage appearing across resistor $R_1$ is passed to the center top of the winding of auto-transformer $T_1$ through the coupling resistor $R_2$. The upper end of auto-transformer $T_1$ is connected to the junction point of resistor $R_1$ and smoothing coil $L_1$, while the lower end is coupled to the base of transistor TR through condenser $C_2$. A tuning condenser $C_3$ is connected across winding of the auto-transformer $T_1$ as shown. The collector of transistor TR is connected to the negative line conductor through the ringer S which is preferably tuned by the shunt condenser $C_4$ which serves to bypass high harmonic frequencies so as to make the current through the ringer more nearly sinusoidal. This condenser $C_4$ is of course, not essential and can be omitted, particularly if the ringer S is arranged with a mechanical and or acoustic resonator tuned to the oscillator frequency.

Thus, the oscillator OSC comprises a three-terminal amplifying device constituted by the transistor TR whose emitter and base are coupled to two terminals of a three-terminal passive regenerative tuned coupling circuit constituted by the elements $T_1$, $C_3$, $R_1$ and $R_2$. The collector of transistor TR and the upper terminal of the auto-transformer $T_1$ are coupled to the line conductors through the ringer S. An oscillator circuit of this type has the considerable advantage that it ensures a high degree of decoupling between the collector of the transistor and the other electrodes to which the tuned circuit $T_1C_3$ is associated. The oscillator output impedance for direct current is also quite high. Thus, the oscillator consumes little current when at rest and its characteristics are hardly affected by the line characteristics.

A similar oscillator is shown in the patent application of J. Martens, Serial No. 835,010 which was filed August 20, 1959, now U.S. Patent No. 3,140,358, and entitled "Electrical Signalling System." There is however an important difference in the operation of these two oscillators, since the junction point of resistors $R_1$ and $R_2$ is not directly connected to the emitter of transistor TR, but it is in fact coupled via a first coupling circuit to this emitter and via a second coupling circuit to the base of transistor TR. The first coupling circuit to the emitter comprises rectifier $G_1$ which is poled as shown to allow the flow of direct current, as well as resistor $R_3$ connecting the emitter of TR to the negative line conductor. On the other hand, the junction point of resistors $R_1$ and $R_2$ is also coupled to the base of TR through resistor $R_4$ in series with rectifier $G_2$, the base of TR being also returned to the negative line conductor, this time through resistor $R_5$.

Resistor $R_4$ and rectifier $G_2$ have been shown as part of the tuned receiver unit REC which is directly branched across the line conductors, at least on the break contact side of cradle contact $H_1$. The latter is serially connected to the negative conductor through the primary winding of transformer $T_2$, the inductance $L_2$ and the condenser $C_5$. The secondary winding of transformer $T_2$ has its outer ends connected via similarly poled rectifiers $G_3$ and $G_4$ to the junction point of resistor $R_4$ and rectifier $G_2$, while the other end of resistor $R_4$ is connected to a midpoint tapping on this secondary winding. Finally, smoothing condenser $C_6$ is branched in shunt across resistor $R_4$.

From this, it will be clear that the unit REC together with the series tuned circuit $L_2C_5$ will react upon a signal corresponding to the resonant frequency of $L_2C_5$ being applied across the line conductors, whereby a rectified direct current voltage will be produced across resistor $R_4$ with a polarity tending to block rectifier $G_2$. While the tuned circuit such as $L_2C_5$ incorporates an inductance distinct from that of the transformer $T_2$, it is evident that by careful design, a simple condenser could produce a reasonably sharp response in conjunction with transformer $T_2$ provided the latter is not unduly loaded.

Normally, in the absence of an alternating current signal of suitable frequency across the line conductors, there is a flow of current through resistor $R_4$ which is determined by the direct current potential at the junction of resistors $R_1$ and $R_2$ and by the total series resistance of $R_4$, $G_2$ in the conductive condition and $R_5$. On the other hand, a direct current also flows through rectifier $G_1$, also in the conductive condition, in series with resistance $R_3$. By a suitable choice of these various resistances and of the forward characteristics of the rectifiers $G_1$ and $G_2$, it will be possible to obtain a D.C. potential at the emitter of TR which is lower than the potential at the base of this PNP transistor whereby the latter will normally be blocked and no oscillations can be generated by OSC, though the latter is permanently powered by D.C. current from the line conductors.

This D.C. current can be of the order of 1 milliampere. Then, assuming that the resistors $R_3$, $R_4$ and $R_5$ have the respective values of 50 kilo-ohms, 2400 ohms and 1 megohm, only about 50 microamperes will flow through the branch including rectifier $G_2$ since the main resistance of that branch, $R_5$ is twenty times as large as the main resistance $R_3$, of the other branch. Due to the difference in the forward characteristics of the two rectifiers $G_1$ and $G_2$, one may obtain a negative bias of the order of 200 to 300 mv. for the emitter of TR with regard to its base, thereby preventing oscillations.

Responsive to the unit REC reacting to the frequency transmitted over the line, the rectified D.C. potential across the resistor $R_4$ opposes the flow of current through rectifier $G_2$ so that transistor TR will now become conductive whereas rectifier $G_2$ will be blocked. Then, the circuit starts to oscillate and under the same conditions of frequency and amplitude stability as the oscillator disclosed in the above noted J. Martens patent application.

With the values of the elements mentioned above, the sensitivity is such that with a received ringing signal of 0.5 volts (R.M.S. value), the oscillator operates at full amplitude. Yet, the selectivity of the circuit $L_2C_5$ and of the tank circuit $T_1C_3$ makes the oscillator insensitive to short kicks and noise pulses. An adjustment of the value of resistor $R_5$ will readily serve to modify the threshold of operation.

To permit ringing supervision, the signal generated by the oscillator OSC may simply be returned across the line conductors by omitting the smoothing filter $L_1C_1$. Due to the tuned circuit $L_2C_5$ and by choosing distinct frequencies for the audible tone generated by OSC and for the ringing signal transmitted over the line, there is no danger of keeping the oscillator OSC operative beyond the control of the ringing signal. Upon the called subscriber answering, the displacement of the cradle contact $H_1$ will prevent the further transmission of the audible tone back to the exchange, thus giving an indication of the answering condition. With distinct frequencies for the ringing signal and for the audible tone, the former may preferably be selected at the lower end of the voice frequency band while the latter is chosen in the region of maximum ear sensitivity. One may choose for instance 400 c.p.c. for the former and 800 c.p.s. for the latter.

To provide the called subscriber with a more pleasing sound however, one will preferably transmit bursts of the 400 c./s. ringing signal during which this signal is however suppressed for alternate half periods of a low frequency such as 13 c.p.s. This will mean that the oscillator OSC during each ringing period of say 1 second will only be triggered every alternate half period of 30 to 40 milliseconds. With respect to the battery at the exchange, the oscillator will therefore act as a fluctuating load and in order to avoid the undesirable battery potential variations across the line conductors, the shunt condenser $C_1$ may be used as shown. Then, the impedance such as $L_1$ allowing the passage of direct current serially inserted between the oscillator OSC and the line conductors permits ringing signal energy to be effectively applied to the tuned receiver unit REC.

The smoothing network $L_1C_1$ being desirable, a preferred solution for returning the audible tone to the exchange is shown in dotted lines in FIG. 1 and it simply consists in providing the coupling condenser $C_7$ between the collector of TR and the break contact $H_1$. By properly choosing the value of $C_7$, any desired amount of power can be returned as ring-back signal to the exchange.

The frequency selective circuit $L_2C_5$ offers the advantage that selective ringing may readily be considered in the case of party lines. Once ringing signals of different frequencies are envisaged, it is also evident that in a general manner, a substation may be made to respond to only one particular frequency, or a combination thereof, whereby this offers the possibility of identifying special line classes of called subscribers and this on an alternating current basis, which gains particular significance in electronic systems.

In such or other systems, one may envisage voice frequency dialling. Thus, one would not replace the dial by a keyset used to control voice frequency oscillators as disclosed in the noted J. Martens application but one would merely use the dial interruptions to control the operation of one or more voice frequency oscillators. The oscillator scheme disclosed in FIG. 1 affords a particularly simple solution permitting voice frequency dialling as shown in FIG. 2.

FIG. 2 shows that the essential elements represented in FIG. 1 may also be used to permit dialling on a voice frequency basis, simply by using the same oscillator which is already provided for ringing purposes.

FIG. 2 essentially uses the same oscillator OSC and the same receiver REC, together with the tuned circuit $L_2C_5$, but the oscillator OSC is provided with a tuning condenser $C_8$ additional to the tuning condenser $C_3$. Upon the subscriber lifting his handset from the cradle, the oscillator shown in FIG. 2 will be disconnected from the positive line conductor since change-over cradle contact $H_1$ is displaced from the shown position to the make position. The oscillator cannot therefore be made operative. At the same moment, the operation of change-over cradle contact $H_2$ disconnects the ringer S and its tuning condenser $C_4$ (FIG. 1) from the oscillator circuit and the collector of transistor TR is now connected to the negative line conductor through resistor $R_6$ serving as dummy load. This will prevent the ringer from being energized responsive to the oscillator being made operative by the caller under the control of his dial.

After dial tone has been received and the subscriber has started to dial, the off-normal dial contacts $DON_1$ and $DON_2$ are operated. The first which is a make contact, will bypass the break contact $H_1$ in order to reconnect the positive line conductor to the inductance $L_1$ so as to provide direct current feed from the oscillator OSC. At the same time, the opening of the off-normal dial break contact $DON_2$ will suppress the control exerted by the tuned receiver REC, whereby the transistor TR will immediately be made conductive and the oscillator will produce a tone frequency which will be sent on the line via the coupling condenser $C_7$ for the purpose of returning the ring-back tone to the exchange.

At the start of the dial movement, the dial interrupting contact $DI_1$ will be closed as shown in FIG. 2, whereby the frequency sent over the line will be determined by condenser $C_3$ and $C_8$ in parallel. Each time the dial contact $DI_1$ is interrupted however, in accordance with the digit dialled, the oscillator frequency will be increased, being then determined by the capacity of condenser $C_3$ only.

In order to protect the tone receivers at the exchange against sound or noises picked up by the microphone, measures may be taken to ensure that the tone receivers are enabled only after the microphone has been short-circuited and/or disconnected from the line and again disabled before the microphone is cut into service again. The tone oscillator shown in FIG. 2 is made operative by off-normal dial contacts and other off-normal dial contacts (not shown in FIG. 2) may be used to disable the microphone at the same instant.

Thus, the tone oscillator OSC at the subset produces a preparation signal as the dial is turned, which is received by the tone receivers at the exchange, to indicate that dial pulses are forthcoming. During the return of the dial to normal, the initial frequency will of course also be transmitted. The preparation tone and the dial pulse tone, corresponding to the opening of the contact $DI_1$, can be selectively received in the exchange and reproduced at two separate outputs for instance, one representing the closed loop and the other the open loop condition of the subscriber's line. Thus, complementary pulse voltages will be produced at the two outputs. A timing arrangement may be provided to recognize the preparation tone in order to discriminate it against false signals which might be picked up by the microphone while the dial is at rest. Such a timing arrangement can also be restarted after each loop opening to measure the interpulse interval. Provided the dial is so arranged, by mechanical adjustment, that between the last dial contact operation and the dial return to normal, a time will elapse which is definitely longer than the longest possible interpulse interval, one will thus be able to recognize with certainty the end of a digit.

In the manner explained above, each series of dial pulses is thus framed between guard signals of a prescribed frequency and easily recognizable by their duration. The dial pulses having another frequency may safely be counted during each frame. If the calling subscriber hangs up his receiver within the duration of a frame, this is recognized by the simultaneous disappearance of both D.C. output signals corresponding to the alternate frequencies. Outside the frame, a premature release will be detected by normal supervision.

It will be recognized that this method of dialling permits advantages which are usually associated with V.F. key sending and hardly any apparatus is required at the subscriber subset, since a ringing oscillator is used for that second purpose.

The above scheme of sending alternate frequencies instead of the usual direct current signals may also be used with considerable advantage in transmitting identifying signals from the substation to the exchange. In V.F. keysending, such as in the noted J. Martens patent application five or six voice frequencies are usually allotted and by transmitting a constant number of these, the various decimal digits and eventually additional signs can be transmitted. But with the voice frequency dialling method of FIG. 2, the digits are identified by the number of times that the second frequency corresponding to the operation of the dial contact $DI_1$ is received at the exchange. Therefore, with this inherently slower signalling method, it is possible by using different values for the condensers $C_3$ and $C_8$ to forward additional information to the exchange. Thus, advantage is taken of this inherently slower serial signalling method. Using six frequencies, it will be possible to provide thirty different identifying signals to the exchange by allotting different pairs of such frequencies for dialling from the substation. Thus, various classes of service for the subscriber's line may be identified, the system may be very useful for identification of party line subscribers and it may also for instance be applicable to coin boxes. When different coins may be used, particularly for toll calls, these various coins may each operate a distinct contact which may result in the modification of one of the two frequencies used for dialling or of both. Many other applications of this very simple identification method may of course, be found. In particular, the nature of the frequencies may also be used in the determination of the called subscriber. For instance, special fast dialling service may be given to public utility services such as police, fire brigade, etc., whereby headquarters may be selected by say only one digit but using a special pair of frequencies. Moreover, even for ordinary subscribers, special keys may be provided to change the pair of transmitting frequencies, e.g. to obtain priority calls, to change the class of the subscriber line in order to prevent unauthorized use of the subset, and so forth.

Evidently, with the use of an additional off-normal dial contact, the two frequencies used for dialling may each be different from the frequency used for ringing the subscriber and determined by condenser $C_3$.

FIG. 3 shows another embodiment of the subset which permits not only alternating current ringing and alternating current dialling, but also alternating current supervision of the loop condition. Resistor $R_6$ is again provided as in FIG. 2 to act as a dummy collector load for the transistor while the handset is off the cradle, but tuning of the oscillator OSC remains fixed this time as shown in the initial circuit used for ringing only in FIG. 1. Instead of the cradle change-over contact $H_1$, a cradle break contact $H_3$ is now used which normally branches a condenser $C_9$ in shunt across condenser $C_5$ used for tuning the receiver REC, which is as in FIG. 1 permanently connected to the oscillator OSC to control its operation.

Direct current is normally supplied to the oscillator OSC in the same manner as disclosed for the arrangement of FIG. 1, and as for this previous arrangement the oscillator OSC is normally inoperative in view of the inhibiting control exerted by the tuned signal receiver REC. Upon a ringing signal being received at the subscriber station, whose frequency corresponds to the series resonant frequency of $L_2$ and $C_5$ and $C_9$ in parallel, the signal receiver REC will produce a rectified signal to operate the oscillator OSC as before, ring-back tone being transmitted to the exchange from the collector of the transmitter through off-normal dial break contact $DON_3$ in series with coupling condenser $C_7$. Upon the called subscriber answering, the opening of cradle contact $H_3$ will however prevent the tuned receiver from further reacting to the signal sent from the exchange whereby this will be an indication at the exchange that the called subscriber has answered since the oscillator will be made inoperative.

But, by alternating the ringing current bursts of V.F. signal from the exchange with a different V.F. signal during the break periods separating the ringing bursts, one may obtain a complete alternating current supervision of the answering condition. Indeed, as described until now, the answering condition can be detected while the ringing signal is actually sent from the exchange, but not between ringing bursts. At those times, D.C. supervision would still be required.

But by using a second V.F. signal sent from the exchange between the ringing bursts and corresponding to the tuning of $L_2$ and $C_5$, the oscillator will be made responsive to this second exchange frequency as soon as the handset is removed from its cradle. Thus, when a ring-back tone disappears at the exchange at the time the ringing frequency is sent, this means the handset is off the cradle. But likewise, if a ring-back tone starts to be received at the exchange while the latter emits the second frequency alternating between the actual ringing bursts, this will also indicate that the handset is off the cradle.

Thus, in this constant alternating current supervision system, an oscillator with the same frequency, determined by condenser $C_3$ is used. The features described above may even be retained while adding alternating current dialling as explained below.

After a new call has been detected and a voice frequency receiver unit has been connected to the calling line at the exchange, a supervision signal having the second voice frequency mentioned above will be sent continuously to the calling subscriber until the end of the dialling procedure. The handset being off its cradle, break contact $H_3$ is open as well as break contact $H_2$, with the result that the tuned receiver REC operates and starts the oscillator which returns its ring-back tone to the exchange through the path involving break contact $DON_3$, the ringer being however disconnected at contact $H_2$, and resistor $R_6$ acting as dummy load as explained before. Thus, a dial tone sent from the exchange leads to a dial-back tone returned to the exchange. As the calling subscriber starts to dial, the off-normal dial contacts will be operated and particularly, as shown in FIG. 2, break contact $DON_3$ will be opened while in the conventional part SUB of the subset, make contact $DON_4$ will provide complete voice immunity during the dialling period by short-circuiting the microphone M.

The fact that a closed loop return signal is continuously received for a substantial period before the first dialed digit causes an interruption, will in most cases be sufficient to exclude faulty operation. Moreover, the signal interruption which cannot be affected by spurious signals since at that time the microphone M is short-circuited, will be followed by the actual dial pulses, which this time will consist in the retransmission of the dial-back tone every time the dial contact is operated, for example, that make contact $DI_2$ is closed to bridge the now open $DON_3$ contact. Interdigital time will of course be characterized by the absence of the dial-back tone during a substantial time, time which is split by yet another transmission of the tone back to the exchange when the off normal $DON_3$ dial contact is closed between digits.

If the absence of the dial-back tone exceeds a certain time, the exchange will of course be able to interpret it as a premature release. An alternative arrangement to that shown in FIG. 3 would yet consist in replacing the make contact $DI_2$ by a break contact, in omitting the break contact $DON_3$ shown in shunt therewith and in using it instead in series with an additional tuning condenser across condenser $C_3$ much in the same manner as shown in FIG. 2 where however the dial pulse break contact was used for that purpose. With such an alternative arrangement, the dial-back tone returned to the exchange would have its frequency modified as soon as the dial was moved off normal causing the short-circuiting of the microphone. Then, each dial pulse would correspond to a short interruption of this modified frequency returned to the exchange.

Since the oscillator frequency may be modified under the control of the dial pulse contact as shown in FIG. 2, or by the dial off-normal contact as explained immediately above, it could be modified also under the joint control of these contacts. The operation of the dial off-normal contact could change the signal from a first frequency to a second, while the operation of the dial contact could restore the signal to the first frequency. Alternatively, this dial contact could also change the signal to a third frequency.

It will be evident that in this manner, and as already noted previously, it will be possible to convey additional information to the exchange from the substation. With the use of three different frequencies during dialling and assuming there is a total of 6 frequencies only, 120 different signals may then be produced to identify characteristics of or events at a substation while the information as to the called party is being signalled.

Just as the system of FIG. 3 may be used to supervise the answering condition of the called subscriber, it might also be used to detect new calls. The exchange could at regular intervals send a calling frequency to each substation which would correspond to the tuning of $L_2$ with $C_5$. Therefore, as long as the handset is on its hook, cradle contact $H_3$ would be closed and the tuned receiver REC would not react whereby the oscillator would remain blocked. But upon a call being originated, the oscillator would imediately be started thereby informing the exchange that a new call must be processed.

It will be appreciated that the various embodiments of the invention incorporate essentially an oscillator which is permanently powered by direct current from the exchange, but which may also be under the permanent control of a low energy signal also transmitted from the exchange and particularly able to pass through electronic gates which have limited power handling capacities. The number of components has been shown to be very small and a single transistor oscillator may be used for a large variety of purposes.

While the principles of the invention have been described above in connection with specific apparatus, it is to be clearly understood that this description is made only by way of example and not as a limitation on the scope of the invention.

What is claimed is:

1. Telephone station apparatus for receiving and transmitting signals over a direct current supplied telephone line interconnecting said station with a central exchange comprising a frequency selective signal receiver for receiving voice frequency signals of a predetermined frequency over said line, a rectifier circuit for rectifying said received signals and for producing an output voltage in accordance therewith, a signal generator powered by the direct current on said line when said generator is activated, means responsive to the said output voltage reaching a predetermined amplitude for activating said signal generator to generate voice frequency ringing signals of a frequency distinct from said predetermined voice frequency signals received over said line, and a signal-responsive device controlled by said signals generated by said signal generator for producing audible signals.

2. Telephone station apparatus as set forth in claim 1, wherein the said signal generator includes a low-pass filter connecting said signal generator to said line, the said filter including a shunt condenser and a series coil.

3. In telephone station apparatus as set forth in claim 1, a transistor in said signal generator having base, emitter and collector electrodes, a tuned three terminal regenerative passive circuit, first coupling means for coupling said base electrode to a first one of said terminals, second coupling means for coupling said emitter electrode to a second one of said terminals, and third coupling means for coupling said collector electrode and a third one of said terminals to said signal-responsive device, and the said means for activating said signal generator including means for modifying one of said coupling circuits to alter the potential between said emitter and base electrodes to cause the said transistor to conduct to cause the said generation of voice frequency ringing signals.

4. Telephone station apparatus as set forth in claim 3, wherein the said first and second coupling means each includes a normally conductive diode in series with a separate differently valued resistance, and wherein the said means for modifying includes means for rendering one of said diodes non-conductive.

5. Telephone station apparatus as set forth in claim 1, including means for connecting the said signal generator to said line to transmit said generated voice frequency ringing signals over said line to provide ring-back signals.

6. Telephone station apparatus as set forth in claim 5 comprising a digit generating device including means for modifying said signal generator to generate two distinct frequencies alternating with one another and further means including said connecting means controlled by said digit generating device for transmitting said two frequencies over said line.

7. Telephone station apparatus as set forth in claim 5 comprising a digit-generating device including means for interrupting the said connection of the signal generator to the said line to thereby transmit digit signals over said line in the form of interruptions of the said signals generated by said signal generator.

8. Telephone station apparatus as set forth in claim 7, including means for modifying said signal generator to generate voice frequency ringing signals characteristic of said station whereby said digit signals transmitted over said line identify the transmitting station to the exclusion of any other station.

9. Telephone station apparatus as set forth in claim 7 comprising off-normal contacts for modifying said signal generator to transmit the said digit signals at a frequency different than said generated voice frequency ringing signals whereby ring-back signals can be discriminated from digit signals.

References Cited by the Examiner

UNITED STATES PATENTS

| | | | |
|---|---|---|---|
| 2,319,306 | 5/43 | Dickieson | 179—84 |
| 2,686,228 | 8/54 | Wroe | 179—84 |
| 2,824,173 | 2/58 | Meacham | 179—8.5 |
| 2,824,175 | 2/58 | Meacham | 179—84 |
| 2,850,650 | 9/58 | Meacham | 179—84 |
| 2,916,558 | 12/59 | Leman | 179—84 |
| 2,951,910 | 9/60 | Bauman | 179—84 |
| 2,967,911 | 1/61 | Flowers et al. | 179—84 |
| 2,976,369 | 3/61 | Salzer | 179—84 |
| 3,004,105 | 10/61 | Goodale et al. | 179—8.5 |

ROBERT H. ROSE, *Primary Examiner.*

WALTER L. LYNDE, *Examiner.*